United States Patent
Gloger et al.

(10) Patent No.: US 10,040,930 B2
(45) Date of Patent: Aug. 7, 2018

(54) POLYMER COMPOSITION WITH HIGH XS, HIGH TM SUITABLE FOR BOPP PROCESSING

(71) Applicants: BOREALIS AG, Vienna (AT); ABU DHABI POLYMERS CO. LTD (BOROUGE) LLC., Abu Dhabi (AE)

(72) Inventors: Dietrich Gloger, Linz (AT); Thomas Horill, Gerasdorf (AT); Vijay Francis, Abu Dhabi (AE); Gurusamy Sakkaraiyappan, Abu Dhabi (AE); Niraj Dixit, Abu Dhabi (AE); Kauno Alastalo, Porvoo (FI); Torvald Vestberg, Porvoo (FI); Johan Defoer, Mechelen (BE)

(73) Assignees: ABU DHABI POLYMERS CO. LTD (BOROUGE) LLC., Abu Dhabi (AE); BOREALIS AG, Vienna (AT)

( * ) Notice: Subject to any disclaimer, the term of this patent is extended or adjusted under 35 U.S.C. 154(b) by 0 days.

(21) Appl. No.: 15/022,664

(22) PCT Filed: Sep. 23, 2014

(86) PCT No.: PCT/EP2014/070203
§ 371 (c)(1),
(2) Date: Mar. 17, 2016

(87) PCT Pub. No.: WO2015/044116
PCT Pub. Date: Apr. 2, 2015

(65) Prior Publication Data
US 2016/0208085 A1  Jul. 21, 2016

(30) Foreign Application Priority Data
Sep. 27, 2013 (EP) .................... 13186537

(51) Int. Cl.
| C08L 23/12 | (2006.01) |
| C08F 210/06 | (2006.01) |
| C08J 5/18 | (2006.01) |
| C08L 23/16 | (2006.01) |
| C08L 23/14 | (2006.01) |

(52) U.S. Cl.
CPC .............. *C08L 23/12* (2013.01); *C08J 5/18* (2013.01); *C08L 23/14* (2013.01); *C08L 23/16* (2013.01); *C08F 210/06* (2013.01); *C08J 2323/12* (2013.01); *C08J 2323/16* (2013.01); *C08L 2203/16* (2013.01); *C08L 2205/02* (2013.01); *C08L 2308/00* (2013.01); *C08L 2314/02* (2013.01)

(58) Field of Classification Search
CPC ........ C08L 23/12; C08L 23/14; C08L 23/142; C08L 23/16; C08L 2205/02; C08L 2308/00; C08J 5/18; C08J 2323/12; C08J 2323/14; C08J 2323/16; C08F 210/06; C08F 210/16
See application file for complete search history.

(56) References Cited

U.S. PATENT DOCUMENTS

| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |
| 5,329,032 A | 7/1994 | Tran et al. |
| 5,391,529 A | 2/1995 | Sangokoya |
| 5,391,793 A | 2/1995 | Marks et al. |
| 5,504,172 A | 4/1996 | Imuta et al. |
| 5,529,850 A | 6/1996 | Morini et al. |
| 5,539,067 A | 7/1996 | Parodi et al. |
| 5,618,771 A | 4/1997 | Parodi et al. |
| 5,693,838 A | 12/1997 | Sangokoya et al. |
| 5,731,253 A | 3/1998 | Sangokoya |

(Continued)

FOREIGN PATENT DOCUMENTS

| CN | 1404500 A | 3/2003 |
| EP | 0 045 977 B1 | 1/1987 |

(Continued)

OTHER PUBLICATIONS

"Glossary of Basic Terms in Polymer Science (IUPAC Recommendations 1996)," *Pure Appl. Chem.*, 68(8):1591-1595 (1996).

(Continued)

*Primary Examiner* — Roberto Rabago
(74) *Attorney, Agent, or Firm* — Leydig, Voit & Mayer, Ltd.

(57) ABSTRACT

Polypropylene copolymer for biaxially oriented polypropylene (BOPP) with low isotacticity, high melting temperature and low comonomer content.

12 Claims, No Drawings

(56) References Cited

U.S. PATENT DOCUMENTS

| | | | |
|---|---|---|---|
| 5,731,451 A | 3/1998 | Smith et al. | |
| 5,744,656 A | 4/1998 | Askham | |
| 6,316,562 B1 | 11/2001 | Munck et al. | |
| 6,489,426 B1 | 12/2002 | Kawamoto et al. | |
| 6,586,528 B1 | 7/2003 | Delaite et al. | |
| 6,642,317 B1 | 11/2003 | Delaite et al. | |
| 7,342,078 B2 | 3/2008 | Schottek et al. | |
| 7,569,651 B2 | 8/2009 | Schottek et al. | |
| 2003/0149199 A1 | 8/2003 | Schottek et al. | |
| 2003/0165703 A1* | 9/2003 | Pelliconi | C08J 5/18 |
| | | | 428/516 |
| 2005/0187367 A1 | 8/2005 | Hori et al. | |
| 2006/0020096 A1 | 1/2006 | Schottek et al. | |
| 2006/0182987 A1 | 8/2006 | Yu et al. | |
| 2006/0211801 A1 | 9/2006 | Miller et al. | |
| 2007/0235896 A1 | 10/2007 | McLeod et al. | |
| 2008/0214767 A1 | 9/2008 | Mehta et al. | |
| 2010/0081760 A1 | 4/2010 | Rhee et al. | |
| 2011/0031645 A1 | 2/2011 | Kuettel et al. | |
| 2014/0031492 A1* | 1/2014 | Reichelt | C08L 23/12 |
| | | | 525/53 |
| 2016/0185946 A1 | 6/2016 | Sandholzer et al. | |
| 2016/0194486 A1 | 7/2016 | Sandholzer et al. | |
| 2016/0200838 A1 | 7/2016 | Reznichenko et al. | |
| 2016/0208085 A1 | 7/2016 | Gloger et al. | |
| 2016/0229158 A1 | 8/2016 | Cavacas et al. | |
| 2016/0237270 A1 | 8/2016 | Wang et al. | |
| 2016/0244539 A1 | 8/2016 | Resconi et al. | |

FOREIGN PATENT DOCUMENTS

| | | |
|---|---|---|
| EP | 0 260 130 A1 | 3/1988 |
| EP | 0 279 586 A2 | 8/1988 |
| EP | 0 045 975 B1 | 4/1989 |
| EP | 0 045 976 B1 | 11/1989 |
| EP | 0 361 493 A1 | 4/1990 |
| EP | 0 423 101 A2 | 4/1991 |
| EP | 0 488 595 A1 | 6/1992 |
| EP | 0 491 566 A2 | 6/1992 |
| EP | 0 537 130 A1 | 4/1993 |
| EP | 0 561 476 A1 | 9/1993 |
| EP | 0 045 976 B2 | 12/1993 |
| EP | 0 594 218 A1 | 4/1994 |
| EP | 0 279 586 B1 | 5/1994 |
| EP | 0 622 380 A1 | 11/1994 |
| EP | 0 045 977 B2 | 3/1995 |
| EP | 0 645 417 A1 | 3/1995 |
| EP | 0 728 769 A1 | 8/1996 |
| EP | 0 586 390 B1 | 5/1997 |
| EP | 0 591 224 B1 | 2/1998 |
| EP | 0 887 379 A1 | 12/1998 |
| EP | 0 887 380 A1 | 12/1998 |
| EP | 0 887 381 A1 | 12/1998 |
| EP | 1 028 984 B1 | 7/2001 |
| EP | 1 359 171 A1 | 11/2003 |
| EP | 1 376 516 A1 | 1/2004 |
| EP | 1 452 630 A1 | 9/2004 |
| EP | 1 183 307 B1 | 7/2005 |
| EP | 0 991 684 B1 | 1/2006 |
| EP | 1 632 529 A1 | 3/2006 |
| EP | 1 448 622 B1 | 4/2006 |
| EP | 1 726 602 A1 | 11/2006 |
| EP | 1 741 725 A1 | 1/2007 |
| EP | 1 788 023 A1 | 5/2007 |
| EP | 1849827 A1 | 10/2007 |
| EP | 1 883 080 A1 | 1/2008 |
| EP | 1 892 264 A1 | 2/2008 |
| EP | 1 923 200 A1 | 5/2008 |
| EP | 1 941 997 A1 | 7/2008 |
| EP | 1 941 998 A1 | 7/2008 |
| EP | 1 947 143 A1 | 7/2008 |
| EP | 1 990 353 A1 | 11/2008 |
| EP | 2 014 714 A1 | 1/2009 |
| EP | 2 062 936 A1 | 5/2009 |
| EP | 2 065 087 A1 | 6/2009 |
| EP | 2 075 284 A1 | 7/2009 |
| EP | 2 174 980 A1 | 4/2010 |
| EP | 2 251 361 A1 | 11/2010 |
| EP | 2 386 582 A1 | 11/2011 |
| EP | 2 386 583 A1 | 11/2011 |
| EP | 2 386 602 A1 | 11/2011 |
| EP | 2 386 604 A1 | 11/2011 |
| EP | 2 038 346 B1 | 1/2012 |
| EP | 2 410 007 A1 | 1/2012 |
| EP | 2 415 831 A1 | 2/2012 |
| EP | 2 423 257 A1 | 2/2012 |
| EP | 1 358 252 B1 | 4/2012 |
| EP | 2 308 923 B1 | 5/2012 |
| EP | 2 532 687 A2 | 12/2012 |
| EP | 2 546 298 A1 | 1/2013 |
| EP | 2 551 299 A1 | 1/2013 |
| EP | 2 565 221 A1 | 3/2013 |
| EP | 2 573 134 A1 | 3/2013 |
| EP | 2 592 112 A1 | 5/2013 |
| EP | 2 610 270 A1 | 7/2013 |
| EP | 2 610 271 A1 | 7/2013 |
| EP | 2 610 272 A1 | 7/2013 |
| EP | 2 610 273 A1 | 7/2013 |
| EP | 2 666 818 A1 | 11/2013 |
| WO | WO 1987/007620 A1 | 12/1987 |
| WO | WO 1992/012182 A1 | 7/1992 |
| WO | WO 1992/013029 A1 | 8/1992 |
| WO | WO 1992/019653 A1 | 11/1992 |
| WO | WO 1992/019658 A1 | 11/1992 |
| WO | WO 1992/019659 A1 | 11/1992 |
| WO | WO 1992/021705 A1 | 12/1992 |
| WO | WO 1993/011165 A1 | 6/1993 |
| WO | WO 1993/011166 A1 | 6/1993 |
| WO | WO 1993/019100 A1 | 9/1993 |
| WO | WO 1994/010180 A1 | 5/1994 |
| WO | WO 1994/014856 A1 | 7/1994 |
| WO | WO 1995/012622 A1 | 5/1995 |
| WO | WO 1995/032994 A1 | 12/1995 |
| WO | WO 1997/010248 A1 | 3/1997 |
| WO | WO 1997/014700 A1 | 4/1997 |
| WO | WO 1997/028170 A1 | 8/1997 |
| WO | WO 1997/036939 A1 | 10/1997 |
| WO | WO 1998/012234 A1 | 3/1998 |
| WO | WO 1998/016359 A1 | 4/1998 |
| WO | WO 1998/038041 A1 | 9/1998 |
| WO | WO 1998/040331 A1 | 9/1998 |
| WO | WO 1998/046616 A1 | 10/1998 |
| WO | WO 1998/047929 A1 | 10/1998 |
| WO | WO 1998/049208 A1 | 11/1998 |
| WO | WO 1998/056831 A1 | 12/1998 |
| WO | WO 1998/058971 A1 | 12/1998 |
| WO | WO 1998/058976 A1 | 12/1998 |
| WO | WO 1998/058977 A1 | 12/1998 |
| WO | WO 1999/010353 A1 | 3/1999 |
| WO | WO 1999/012981 A1 | 3/1999 |
| WO | WO 1999/019335 A1 | 4/1999 |
| WO | WO 1999/024478 A1 | 5/1999 |
| WO | WO 1999/024479 A1 | 5/1999 |
| WO | WO 1999/033842 A1 | 7/1999 |
| WO | WO 1999/041290 A1 | 8/1999 |
| WO | WO 2000/034341 A2 | 6/2000 |
| WO | WO 2000/068315 A1 | 11/2000 |
| WO | WO 2001/048034 A2 | 7/2001 |
| WO | WO 2001/058970 A1 | 8/2001 |
| WO | WO 2001/070395 A2 | 9/2001 |
| WO | WO 2002/002576 A1 | 1/2002 |
| WO | WO 2002/051912 A1 | 7/2002 |
| WO | WO 2002/057342 A2 | 7/2002 |
| WO | WO 2003/000754 A1 | 1/2003 |
| WO | WO 2003/000755 A2 | 1/2003 |
| WO | WO 2003/000756 A1 | 1/2003 |
| WO | WO 2003/000757 A1 | 1/2003 |
| WO | WO 2003/051934 A2 | 6/2003 |
| WO | WO 2003/054035 A1 | 7/2003 |
| WO | WO 2003/066698 A1 | 8/2003 |
| WO | WO 2003/082879 A1 | 10/2003 |
| WO | WO 2004/000899 A1 | 12/2003 |
| WO | WO 2004/013193 A2 | 2/2004 |

(56) References Cited

FOREIGN PATENT DOCUMENTS

| | | |
|---|---|---|
| WO | WO 2004/029112 A1 | 4/2004 |
| WO | WO 2004/111095 A1 | 12/2004 |
| WO | WO 2005/066247 A1 | 7/2005 |
| WO | WO 2005/105863 A2 | 11/2005 |
| WO | WO 2006/069733 A1 | 7/2006 |
| WO | WO 2006/086134 A1 | 8/2006 |
| WO | WO 2006/097497 A1 | 9/2006 |
| WO | WO 2007/057224 A1 | 5/2007 |
| WO | WO 2007/077027 A1 | 7/2007 |
| WO | WO 2007/107448 A1 | 9/2007 |
| WO | WO 2007/116034 A1 | 10/2007 |
| WO | WO 2007/122239 A1 | 11/2007 |
| WO | WO 2007/137853 A1 | 12/2007 |
| WO | WO 2008/034630 A1 | 3/2008 |
| WO | WO 2008/074713 A1 | 6/2008 |
| WO | WO 2008/132035 A1 | 11/2008 |
| WO | WO 2009/019169 A1 | 2/2009 |
| WO | WO 2009/027075 A2 | 3/2009 |
| WO | WO 2009/054832 A1 | 4/2009 |
| WO | WO 2009/063819 A1 | 5/2009 |
| WO | WO 2009/077287 A1 | 6/2009 |
| WO | WO 2010/009827 A1 | 1/2010 |
| WO | WO 2010/039715 A1 | 4/2010 |
| WO | WO 2010/052260 A1 | 5/2010 |
| WO | WO 2010/053644 A1 | 5/2010 |
| WO | WO 2010/082943 A1 | 7/2010 |
| WO | WO 2010/142540 A1 | 12/2010 |
| WO | WO 2011/023594 A1 | 3/2011 |
| WO | WO 2011/039305 A1 | 4/2011 |
| WO | WO 2011/080151 A1 | 7/2011 |
| WO | WO 2011/080153 A1 | 7/2011 |
| WO | WO 2011/135004 A2 | 11/2011 |
| WO | WO 2011/135005 A2 | 11/2011 |
| WO | WO 2011/138211 A1 | 11/2011 |
| WO | WO 2011/141380 A1 | 11/2011 |
| WO | WO 2011/144703 A1 | 11/2011 |
| WO | WO 2011/160936 A1 | 12/2011 |
| WO | WO 2012/001052 A2 | 1/2012 |
| WO | WO 2012/007430 A1 | 1/2012 |
| WO | WO 2012/093098 A1 * | 7/2012 |
| WO | WO 2013/004507 A1 | 1/2013 |
| WO | WO 2013/007650 A1 | 1/2013 |
| WO | WO 2013/010879 A1 | 1/2013 |
| WO | WO 2013/030210 A1 | 3/2013 |
| WO | WO 2013/092615 A1 | 6/2013 |
| WO | WO 2013/092620 A1 | 6/2013 |
| WO | WO 2013/127707 A1 | 9/2013 |
| WO | WO 2014/023603 A1 | 2/2014 |
| WO | WO 2014/023604 A1 | 2/2014 |
| WO | WO 2015/022127 A1 | 2/2015 |
| WO | WO 2015/024887 A1 | 2/2015 |
| WO | WO 2015/024891 A1 | 2/2015 |
| WO | WO 2015/044116 A1 | 4/2015 |
| WO | WO 2015/052246 A1 | 4/2015 |
| WO | WO 2015/059229 A1 | 4/2015 |
| WO | WO 2015/059230 A1 | 4/2015 |
| WO | WO 2015/062936 A1 | 5/2015 |
| WO | WO 2015/075088 A1 | 5/2015 |
| WO | WO 2015/082379 A1 | 6/2015 |
| WO | WO 2015/091660 A1 | 6/2015 |
| WO | WO 2015/091829 A1 | 6/2015 |
| WO | WO 2015/091839 A1 | 6/2015 |
| WO | WO 2015/101593 A1 | 7/2015 |
| WO | WO 2015/107020 A1 | 7/2015 |
| WO | WO 2015/113907 A1 | 8/2015 |
| WO | WO 2015/117948 A1 | 8/2015 |
| WO | WO 2015/117958 A1 | 8/2015 |
| WO | WO 2015/121160 A1 | 8/2015 |

OTHER PUBLICATIONS

"MDO Film—Oriented PE and PP packaging film," IN0128/GB FF 2004 10, Borealis A/S (2004).

Abiru et al., "Microstructural Characterization of Propylene-Butene-1 Copolymer Using Temperature Rising elution Fractionation," *J. Appl. Polymer Sci* 68:1493-1501 (1998).

Atwood, "Chapter 6: Anionic and Cationic Organoaluminum Compounds," *Coord. Chem. Alum.*, VCH, New York, NY, pp. 197-232 (1993).

Britovsek et al., "The Search for New-Generation Olefin Polymerization Catalysts: Life beyond Metallocenes," *Angew. Chem, Int. Ed.*, vol. 38(4), pp. 428-447 (1999).

Busico et al., "Alk-1-ene Polymerization in the Presence of a Monocyclopentadienyl Zirconium(IV) Acetamidinate Catalyst: Microstructural and Mechanistic Insights[a]," *Macromol. Rapid Commun.* 28:1128-1134 (2007).

Busico et al., "Full Assignment of the $^{13}C$ NMR Spectra of Regioregular Polypropylenes: Methyl and Methylene Region," *Macromolecules* 30:6251-6263 (1997).

Busico et al., "Microstructure of polypropylene," *Prog. Polym. Sci.* 26:443-533 (2001).

Castignolles et al., "Detection and quantification of branching in polyacrylates by size-exclusion chromatography (SEC) and melt-state $^{13}C$ NMR spectroscopy," *Polymer*, 50(11):2373-2383, (2009).

Cheng, "$^{13}C$ NMR Analysis of Ethylene-Propylene Rubbers," *Macromolecules* 17:1950-1955 (1984).

Cimmino et al., "Thermal and mechanical properties of isotactic random propylene-butene-1 copolymers," *Polymer* 19:1222-1223 (1978).

Crispino et al., "Influence of Composition on the Melt Crystallization of Isotactic Random Propylene/1-Butene Copolymers," *Makromol. Chem.* 181:1747-1755 (1980).

Filip et al., "Heteronuclear decoupling under fast MAS by a rotor-synchronized Hahn-echo pulse train,"*J. Magnet. Reson.* 176:239-243 (2005).

Fujiyama et al., "Effect of Molecular Parameters on the Shrinkage of Injection-Molded Polypropylene," *J. Appl. Polym. Sci.* 22:1225-1241 (1978).

Gahleitner et al., "Nucleation of Polypropylene Homo- and Copolymers," *International Polymer Processing* 26(1):2-20 (2011).

Galli et al., "Technology: driving force behind innovation and growth of polyolefins," *Prog. Polym. Sci.* 26:1287-1336 (2001).

Grein et al., "Impact Modified Isotatic Polypropylene with Controlled Rubber Intrinsic Viscosities: Some New Aspects About Morphology and Fracture," *J. Appl. Polymer Sci.*, 87:1702-1712 (2003).

Griffin et al., "Low-load rotor-synchronised Hahn-echo pulse train (RS-HEPT) $^1H$ decoupling in solid-state NMR: factors affecting MAS spin-echo dephasing times," *Magn. Reson. Chem.* 45:S198-S208 (2007).

Holbrey et al., "Liquid clathrate formation in ionic liquid-aromatic mixtures," *Chem. Comm.*, 2003, pp. 476-477.

Kakugo et al., "$^{13}C$ NMR Determination of Monomer Sequence Distribution in Ethylene-Propylene Copolymers Prepared with $\delta$-TiCl$_3$-Al(C$_2$H$_5$)$_2$Cl," *Macromolecules* 15:1150-1152 (1982).

Klimke et al., "Optimisation and Application of Polyolefin Branch Quantification by Melt-State $^{13}C$ NMR Spectroscopy," *Macromol. Chem. Phys.* 207(4):382-395 (2006).

McAuley et al., "On-line Inference of Polymer Properties in an Industrial Polyethylene Reactor," *AIChE Journal*, vol. 37, No. 6, pp. 825-835 (1991).

Myhre et al., "Oriented PE films—Expanding Opportunities with Borstar® PE," Maack Speciality Films, pp. 1-10 (2001).

Parkinson et al., "Effect of Branch Length on $^{13}C$ NMR Relaxation Properties in Molten Poly[ethylene-co-($\alpha$-olefin)] Model Systems," *Macromol. Chem. Phys.* 208(19-20):2128-2133 (2007).

Periodic Table (IUPAC 2007).

*Plastics Additives Handbook*, 5th edition, Hans Zweifel, Editor, Hanser Publishers, Munich, pp. 871-873 (2001).

*Plastics Additives Handbook*, 5th edition, Hans Zweifel, Editor, Hanser Publishers, Munich, pp. 956-965 (2001).

Pollard et al., "Observation of Chain Branching in Polyethylene in the Solid State and Melt via 13C NMR Spectroscopy and Melt NMR Relaxation Time Measurements," *Macromolecules*, 37(3):813-825 (2004).

*Propylene Handbook*, 2$^{nd}$ *Edition*, Chapter 7.2.2 "Oriented Films," pp. 405-415, Nello Pasquini, Editor, Hanser (2005).

(56) References Cited

OTHER PUBLICATIONS

Randall, "A Review of High Resolution Liquid $^{13}$Carbon Nuclear Magnetic Resonance Characterizations of Ethylene-Based Polymers," *JMS-Rev. Macromol. Chem. Phys.*, C29(2 & 3):201-317 (1989).

Resconi et al., "Diastereoselective Synthesis, Molecular Structure, and Solution Dynamics of meso- and rac-[Ethylenebis(4,7-dimethyl-η5-1-indenyl)]zirconium Dichloride Isomers and Chain Transfer Reactions in Propene Polymerization with the rac Isomer," *Organometallics* 15(23):5046-5059 (1996).

Resconi et al., "Highly Regiospecific Zirconocene Catalysts for the Isospecific Polymerization of Propene," *JACS* 120(10):2308-2321 (1998).

Resconi et al., "Selectivity in Propene Polymerization with Metallocene Catalysts," *Chem. Rev.* 100(4):1253-1345 (2000).

Singh et al., "Triad sequence determination of ethylene-propylene copolymers—application of quantitative $^{13}$C NMR," *Polymer Testing* 28(5):475-479 (2009).

Spaleck et al., "The Influence of Aromatic Substituents on the Polymerization Behavior of Bridged Zirconocene Catalysts," *Organometallics* 13:954-963 (1994).

Spear et al., "Liquid Clathrates," *Encyclopedia of Supramolecular Chemistry*, J.L. Atwood and J.W. Steed (Eds.); Marcel Dekker: New York, pp. 804-808 (2004).

Wang et al., "Structural Analysis of Ethylene/Propylene Copolymers Synthesized with a Constrained Geometry Catalyst," *Macromolecules* 33:1157-1162 (2000).

Zhou et al., "A new decoupling method for accurate quantification of polyethylene copolymer composition and triad sequence distribution with $^{13}$C NMR," *J. Magnet. Reson.* 187:225-233 (2007).

European Patent Office, International Search Report in International Application No. PCT/EP2014/070203 (dated Dec. 19, 2014).

European Patent Office, Written Opinion in International Application No. PCT/EP2014/070203 (dated Dec. 19, 2014).

European Patent Office, International Preliminary Report on Patentability in International Application No. PCT/EP2014/070203 (dated Mar. 29, 2016).

European Patent Office, Extended European Search Report in European Patent Application No. 13186537.0 (dated Feb. 17, 2014).

"Datebook", *Plastics News*, downloaded from www.plasticsnews.com/article/19981005/NEWS/310059973&template=printthis, 5 pages (1998).

Logan et al., "Optimization of Oriented Film Performance through Modification and Control of Polypropylene Microstructure", *Film Pack '98*, 25 pages (1998).

European Patent Office, Notice of Opposition in European Patent No. EP 2853563 B1 (dated Mar. 15, 2017).

European Patent Office, Communication Pursuant to Rule 114(2) EPC—Third Party Observation in European Patent No. EP 2853563 B1 (dated Aug. 31, 2017).

State Intellectual Property Office of the People's Republic of China, Third Office Action in Chinese Patent Application No. 201480052159.6 (dated May 17, 2018).

* cited by examiner

POLYMER COMPOSITION WITH HIGH XS, HIGH TM SUITABLE FOR BOPP PROCESSING

CROSS-REFERENCE TO RELATED APPLICATIONS

This patent application is the U.S. national phase of International Application No. PCT/EP2014/070203, filed on Sep. 23, 2014, which claims the benefit of European Patent Application No. 13186537.0, filed Sep 27, 2013, the disclosures of which are incorporated herein by reference in their entireties for all purposes.

The present invention relates to a new propylene copolymer having a high melting temperature, suitable for biaxially oriented film processing, a process for its manufacture and a biaxially oriented polypropylene (BOPP).

The properties of a polymer film are highly dependent from the orientation of the polymer chains within. For many applications biaxially oriented polymer films are required. Biaxially oriented polymer films are usually prepared from reheating an unoriented polymer film to a temperature at which the crystals are partially melted and subsequently stretching it into the desired shape. The stretched film is cooled reforming the crystals locking the orientation in place.

Polypropylene is the material of choice for many biaxially oriented polymer film applications. The polypropylene has to meet both the properties required in the end product, as well as the properties required in the film manufacture and stretching process. Due to the deviating properties required in different end products, a broad processing window for the film manufacture is desirable.

It is therefore an object of the present invention to provide polypropylene for the manufacture of biaxially oriented polypropylene films with a good balance between processability and mechanical properties, in particular, to provide a reasonably stiff polypropylene with a soft drawing behavior, for preparing biaxially oriented polypropylene (BOPP) over a broad processing window. It is a further object of the present invention to provide a process for the manufacture of a polypropylene with the above properties. It is yet a further object of the present invention to provide a biaxially oriented polypropylene (BOPP) comprising a polypropylene with the above properties, and a process for obtaining the same.

The foregoing and other objectives are solved by the subject matter of the independent claims. Advantageous embodiments of the present invention are defined in the corresponding dependent claims.

The finding of the present invention is a polypropylene copolymer (R-PP) having
(a) a comonomer content in the range from 0.1 to 3.0 mol-%,
(b) a melt flow rate $MFR_2$ (230° C.) measured according to ISO 1133 in the range from 1.0 to 10.0 g/10 min.
(c) a melting temperature $T_m$ of more than 150.0° C. and
(d) an isotacticity of not more than 93.0%, preferably not more than 92.0%.

Preferably the polypropylene copolymer (R-PP) has a rather high xylene cold soluble fraction (XCS) in the range from 1.0 to 10.0 wt.-%, more preferably from 2.0 to 8.0 wt.-%, even more preferably from 4.0 to 7.0 wt.-%, based on the weight of the polypropylene copolymer (R-PP).

Preferably the polypropylene copolymer (R-PP) has a Vicat A softening point below 155.0° C., more preferably below 154.0° C., even more preferably below 152.0° C., yet more preferably below 151.5° C. In particular it is preferred that the polypropylene copolymer (R-PP) has a Vicat A softening point in the range from 155.0° C. to 145° C., more preferably from 154.0° C. to 148° C., even more preferably from 152.0° C. to 148.0° C., yet more preferably from 151.5° C. to 148° C.

Surprisingly, it was found that it is possible to provide a rather soft propylene copolymer with a rather high xylene cold soluble fraction (XCS) and a rather low Vicat A softening point, maintaining a high melting point, thus, providing a sufficient stiffness for the efficient manufacture of biaxially oriented polypropylene (BOPP).

The comonomer content has a significant influence on the properties of the polypropylene copolymer (R-PP). The expression "comonomer" refers to a polymerizable unit different to propylene. According to the present invention the amount of comonomer should be relatively low. It is preferred that the polypropylene copolymer (R-PP) has a comonomer content in the range from 0.1 to 3.0 mol-%, preferably from 0.1 to 1.5 mol.-%, even more preferably from 0.2 to 1.0 mol.-%, yet more preferably from 0.2 to 0.7 mol.-%.

It is appreciated that the polypropylene copolymer (R-PP) comprises comonomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the polypropylene copolymer (R-PP) comprises comonomers such as ethylene and/or 1-butene and/or 1-hexene. Even more preferably the polypropylene copolymer (R-PP) comprises comonomers such as ethylene and/or 1-butene. According to an embodiment, the comonomer is selected from ethylene, $C_4$ to $C_{12}$ α-olefin, and mixtures thereof. According to a more preferred embodiment the comonomer is selected from ethylene, $C_4$ to $C_8$ α-olefin and mixtures thereof. According to an even more preferred embodiment the comonomer of the polypropylene copolymer (R-PP) is ethylene.

As explained above, the present invention is directed a rather soft propylene copolymer suitable for the efficient manufacture of biaxially oriented polypropylene (BOPP). In order to provide the required stiffness for the efficient manufacture of biaxially oriented polypropylene (BOPP), the polypropylene copolymer (R-PP) should have a rather high melting temperature. It is preferred that the polypropylene copolymer (R-PP) has a melting temperature $T_m$ of more than 150.0° C., preferably more than 155.0° C., even more preferably at least 158.0° C., like at least 160° C. In particular it is preferred that the polypropylene copolymer (R-PP) has a melting temperature $T_m$ in the range from more than 150.0° C. to 170.0° C., more preferably from more than 155.0° C. to 168.0° C., even more preferably from 158.0° C. to 165.0° C., like in the range 160.0 to 165.0° C.

Preferably the polypropylene copolymer (R-PP) has a crystallization temperature below 130.0° C., more preferably in the range of 100 to 130.0° C., still more preferably in the range of 105 to 128.0° C., yet more preferably in the range of 108 to 125.0° C.

The melting temperature and the crystallization temperature have been measured on the polypropylene copolymer (R-PP) containing no α-nucleating agent.

One finding of the present invention is that the polypropylene copolymer (R-PP) according to the present invention has a rather low isotacticity, which contributes to the softness of the propylene copolymer (R-PP). Accordingly, it is preferred the polypropylene copolymer (R-PP) has an isotacticity of not more than 93.0%, more preferably not more than 92.0%, like 89.0 to 92.0%, yet more preferably of not more than 91.5%, like 89.5 to 91.5%, still more preferably of not more than 91.0%; like 89-5 to 91.0%.

A further characteristic of the polypropylene copolymer (R-PP) is the low amount of misinsertions within the polymer chain, which indicates that the polypropylene is preferably produced in the presence of a Ziegler-Natta catalyst.

Preferably the polypropylene copolymer (R-PP) has 2.1 erythro regio defects of equal or below 0.4 mol.-%, more preferably equal or below than 0.2 mol.-%, yet more preferably of equal or below 0.1 mol.-%, determined by $^{13}$C-NMR spectroscopy. In an especially preferred embodiment no 2.1 erythro regio-defects are detectable.

According to an embodiment the polypropylene copolymer (R-PP) has a melt flow rate MFR$_2$ (230° C.) measured according to ISO 1133 in the range from 1.0 to 10.0 g/10 min, preferably from 1.0 to 5.0 g/10 min, even more preferably from 1.5 to 5.0 g/10 min.

It is further preferred that the polypropylene copolymer (R-PP) has a molecular weight distribution (MWD) in the range from3.0 to 10.0, more preferably from from 3.5 to 8.0, like in the range of 4.0 to 6.0.

It is preferred that the polypropylene copolymer is not a heterophasic system, i.e. a system comprising a crystalline matrix phase in which an elastomeric phase is dispersed. Accordingly, it is preferred that the polypropylene copolymer (R-PP) is monophasic.

The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

According to a preferred embodiment the polypropylene copolymer (R-PP) has a glass transition temperature in the range from −12 to 2° C., preferably in the range from −10 to 0° C. and/or no glass transition temperature below −30° C., preferably below −25° C., more preferably below −20° C.

The polypropylene copolymer (R-PP) according to this invention preferably comprises, more preferably consists of, two fractions, namely a first propylene homopolymer fraction (R-PP1) and a second propylene copolymer fraction (R-PP2).

If in the following reference is made to the first fraction the first propylene homopolymer fraction (R-PP1) is meant and if reference is made to the second fraction the second propylene copolymer fraction (R-PP2) is meant.

The expression "propylene homopolymer" refers to a polypropylene that consists of at least 99.8 mol-%, more preferably 99.8 wt.-% of propylene units. It is preferred that only propylene units in the propylene homopolymer are detectable.

According to an embodiment the first propylene homopolymer fraction (R-PP1) and the second propylene copolymer fraction (R-PP2) are the only polymer components in the polypropylene copolymer (R-PP).

The comonomer content shall be rather low for the second propylene copolymer fraction (R-PP2). Accordingly, the comonomer content of the second propylene copolymer fraction (R-PP2) is in the range from 0.1 to 6.0 mol.-%, preferably from 0.1 to 5.0 mol.-%, even more preferably from 0.2 to 3.0 mol.-%, even more preferably 0.3 to 1.0 mol.-%.

Concerning the comonomers used in the second propylene copolymer fraction (R-PP2) it is referred to the information provided for the polypropylene copolymer (R-PP).

Accordingly, it is appreciated that the second propylene copolymer fraction (R-PP2) comprises comonomers copolymerizable with propylene, for example comonomers such as ethylene and/or C$_4$ to C$_{12}$ α-olefins, in particular ethylene and/or C$_4$ to C$_8$ α-olefins, e.g. 1-butene and/or 1-hexene. According to an embodiment the comonomer of the second propylene copolymer (R-PP2) is selected from ethylene, C$_4$ to C$_{12}$ α-olefin, and mixtures thereof. According to a preferred embodiment the comonomer of the second propylene copolymer fraction (R-PP2) is selected from ethylene, C$_4$ to C$_8$ α-olefin and mixtures thereof. According to an even more preferred embodiment the comonomer of the second propylene copolymer fraction (R-PP2) is ethylene.

In an embodiment the polypropylene copolymer (R-PP) comprises a first propylene homopolymer fraction (R-PP1) and a second propylene copolymer fraction (R-PP2), wherein the weight ratio between the first propylene homopolymer fraction (R-PP1) and the second propylene copolymer fraction (R-PP2) [(R-PP1)/(R-PP2)] is in the range from 70/30 to 30/70, preferably from 60/40 to 40/60.

One finding of the present invention is that the properties of propylene copolymers can be improved with respect to biaxially oriented polymer film applications by providing propylene copolymers comprising at least two different propylene fractions which differ from each other in their melt flow rate. Thus, in a preferred embodiment the polypropylene copolymer (R-PP) comprises two fractions, a first propylene homopolymer fraction (R-PP1) and a second propylene copolymer fraction (R-PP2), wherein said first propylene homopolymer fraction (R-PP1) differs from said second propylene copolymer fraction (R-PP2) in the melt flow rate.

It is preferred that polypropylene copolymer (R-PP) comprises a first propylene homopolymer fraction (R-PP1) and a second propylene copolymer fraction (R-PP2), wherein the first propylene homopolymer fraction (R-PP1) has a higher melt flow rate than the second propylene copolymer fraction (R-PP2).

Accordingly it is preferred that the first propylene homopolymer fraction (R-PP1) and the second propylene copolymer fraction (R-PP2) fulfill together the in equation (Ia), preferably in equation (Ib), even more preferably in equation (Ic), yet more preferably in equation (Id)

$$\frac{MFR(R-PP1)}{MFR(R-PP2)} \geq 1.5 \tag{Ia}$$

$$1.5 \leq \frac{MFR(R-PP1)}{MFR(R-PP2)} \leq 70 \tag{Ib}$$

$$2.0 \leq \frac{MFR(R-PP1)}{MFR(R-PP2)} \leq 30 \tag{Ic}$$

$$2.5 \leq \frac{MFR(R-PP1)}{MFR(R-PP2)} \leq 10 \tag{Id}$$

wherein

MFR (R-PP1) is the melt flow rate MFR$_2$ (230° C.) [g/10 min] of the first propylene homopolymer fraction (R-PP1) and MFR (R-PP2) is the melt flow rate MFR$_2$(230° C.) [g/10 min] of the second propylene copolymer fraction (R-PP2).

Alternatively or additionally to the previous paragraph the polypropylene copolymer (R-PP) and the second propylene copolymer fraction (R-PP2) fulfill together the in equation (IIa)), preferably in equation (IIb), even more preferably in equation (IIc), yet more preferably in equation (IId)

$$\frac{MFR(R-PP1)}{MFR(R-PP)} \geq 1.3 \qquad \text{(IIa)}$$

$$1.3 \leq \frac{MFR(R-PP1)}{MFR(R-PP)} \leq 20 \qquad \text{(IIb)}$$

$$1.5 \leq \frac{MFR(R-PP1)}{MFR(R-PP)} \leq 15 \qquad \text{(IIc)}$$

$$1.7 \leq \frac{MFR(R-PP1)}{MFR(R-PP)} \leq 10 \qquad \text{(IId)}$$

wherein MFR (R-PP) is the melt flow rate $MFR_2$ (230° C.) [g/10 min] of the polypropylene copolymer (R-PP) and MFR (R-PP1) is the melt flow rate $MFR_2$ (230° C.) [g/10 min] of the first propylene homopolymer fraction (R-PP1).

Thus it is especially preferred that
(a) the first propylene homopolymer fraction (R-PP1) has a melt flow rate $MFR_2$ (230° C.) in the range from 2.0 to 15.0 g/10 min, preferably from 3.0 to 10.0 g/10 min, even more preferably from 3.0 to 8.0 g/10 min, yet more preferably from 3.5 to 7.5, and/or
(b) the second propylene copolymer fraction (R-PP2) has a melt flow rate $MFR_2$ (230° C.) measured according to ISO 1133 in the range from 0.1 to 5.0 g/10 min, preferably from 0.5 to 3.0 g/10 min, even more preferably from 0.8 to 2.5 g/10 min, with the proviso that the first propylene homopolymer fraction (R-PP1) has a higher melt flow rate than the second propylene copolymer fraction (R-PP2).

As mentioned above, the present invention is directed to a rather soft propylene copolymer (R-PP) (preferably comprising a propylene homopolymer fraction (R-PP1) and a propylene copolymer fraction (R-PP2)) comprising a rather low amount of comonomer. In order to provide propylene copolymer (R-PP) with the desired softness, it is appreciated, that the isotacticity of the propylene copolymer (R-PP) is rather low. Thus, it is preferred that also its polymer fractions show low isotacticity. Thus it is preferred that the propylene homopolymer fraction (R-PP1) has an isotacticity of not more than 93.0%, more preferably not more than 92.0%, like 89.0 to 92.0%, yet more preferably of not more than 91.5%, like 89.5 to 91.5%, still more preferably of not more than 91.0%; like 89-5 to 91.0%.

Preferably, the first propylene homopolymer fraction (R-PP1) has 2.1 erythro regio defects of equal or below 0.4 mol.-%, more preferably equal or below than 0.2 mol.-%, yet more preferably of equal or below 0.1 mol.-%, determined by $^{13}$C-NMR spectroscopy. In an especially preferred embodiment no 2,1 erythro regio-defects are detectable.

Preferably, the polypropylene copolymer (R-PP) comprises no α-nucleating agent.

The polypropylene copolymer (R-PP) as defined in the instant invention may contain up to 5.0 wt.-% of the additives usual in the field to which the present application pertaines, like antioxidants, slip agents and antiblocking agents. Preferably the additive content is below 3.0 wt.-%, like below 1.0 wt.-%. Such additives are generally commercially available and are described, for example, in "Plastic Additives Handbook", 5th edition, 2001 of Hans Zweifel.

The present invention also relates to a process for the preparation a polypropylene copolymer (R-PP) comprising a first propylene homopolymer fraction (R-PP1) and a second propylene copolymer fraction (R-PP2). In particular a two stage process for the preparation a polypropylene copolymer (R-PP) comprising a first propylene homopolymer fraction (R-PP1) and a second propylene copolymer fraction (R-PP2).

Even though the present invention relates to a two stage process for the preparation a polypropylene copolymer (R-PP), it should be understood, that the process may contain additional polymerization stages to the two stages disclosed. It may for example contain additional polymerization stages, such as a prepolymerization stage, as long as the polymer produced in such additional stages does not substantially influence the properties of the propylene copolymer (R-PP). Furthermore, either one or both of the two polymerization stages disclosed may be conducted as two or more sub-stages, provided that the polymer fraction produced in each such sub-stage, as well as their mixture, matches the description for the polymer of the respective stage. However, it is preferred to conduct each of the polymerization stage as a single polymerization stage. Therefore, in a preferred embodiment the polymerization process consists of two polymerization stages which may be preceded a prepolymerization stage.

Thus, it is preferred, that the process for the preparation of a polypropylene copolymer (R-PP) comprising a first propylene homopolymer fraction (R-PP1) and a second propylene copolymer fraction (R-PP2), is a sequential polymerization process comprising at least two reactors connected in series, wherein said process comprises the steps of
(a) polymerizing in a first reactor (R-1) propylene obtaining thereby said first propylene homopolymer fraction (R-PP1),
(b) transferring said first propylene homopolymer fraction (R-PP1) and unreacted comonomers from the first reactor (R-1) into a second reactor (R-2),
(c) feeding to said second reactor (R-2)
  (c1) propylene and
  (c2) ethylene and/or a $C_4$ to $C_{12}$ α-olefin,
(d) polymerizing in said second reactor (R-2) and in the presence of said first propylene homopolymer fraction (R-PP1)
  (d1) propylene and
  (d2) ethylene and/or a $C_4$ to $C_{12}$ α-olefin,
obtaining said second propylene copolymer fraction (R-PP2), i.e. obtaining said polypropylene copolymer (R-PP) comprising said first propylene homopolymer fraction (R-PP1) and said second propylene copolymer fraction (R-PP2),
wherein the polymerization takes place in the presence of a solid catalyst system (SCS), said solid catalyst system (SCS) comprises
(i) a transition metal (TM) selected from one of the groups 4 to 6 of the periodic table (IUPAC), preferably group 4 of the periodic table (IUPAC), even more preferably Ti,
(ii) a metal which is selected from one of the groups 1 to 3 of the periodic table (IUPAC), preferably Mg,
(iii) an internal electron donor (ID)
(iv) a cocatalyst (Co), like an aluminum compound, and
(v) an external donor (ED), like an organo silane compound especially an hydrocarbyloxy silane compound.

As indicated above the instant polypropylene copolymer (R-PP) is produced in a sequential polymerization process. The term "sequential polymerization process" indicates that the polypropylene copolymer (R-PP) is produced in at least two reactors connected in series. More precisely the "term sequential polymerization process" indicates in the present application that the polymer of the first reactor (R-1), i.e. the first propylene homopolymer fraction (R-PP1), is directly conveyed with unreacted comonomers to the second reactor (R-2) in which the second propylene copolymer fraction (R-PP2) is produced. Accordingly one aspect of the present process is the preparation of the polypropylene copolymer (R-PP) in two different reactors, wherein the reaction material of the first reactor (R-1) is directly conveyed to the second reactor (R-2), and thus the polypropylene copolymer (R-PP) comprises two different fractions, namely the first propylene homopolymer fraction (R-PP1) and the second propylene copolymer fraction (R-PP2). Accordingly the present process comprises at least a first reactor (R-1) and a second reactor (R-2). In one specific embodiment the instant process consists of two the polymerization reactors (R-1) and (R-2). The term "polymerization reactor" shall indicate that the main polymerization takes place.

Thus in case the process consists of two polymerization reactors, this definition does not exclude the option that the overall process comprises for instance a pre-polymerization step in a pre-polymerization reactor as explained above. The term "consists of" is only a closing formulation in view of the main polymerization reactors.

Preferably, the first propylene homopolymer fraction (R-PP1) prepared in the first stage, i.e. step (a), has a melt flow rate $MFR_2$ (230° C.) as defined above. If the melt flow rate $MFR_2$ (230° C.) exceeds the defined range an increased amount of hydrogen would be required and consequently also a separation step to remove excess hydrogen. Without that additional separation step it would not be possible to reach the desired melt flow rate in the second polymerization stage. On the other hand, if the melt flow rate is too low a propylene copolymer (R-PP) with a narrow molecular weight distribution and thus unacceptable polymer properties would be obtained.

The first reactor (R-1) is preferably a slurry reactor (SR) and can be any continuous or simple stirred batch tank reactor or loop reactor operating in bulk or slurry. Bulk means a polymerization in a reaction medium that comprises of at least 60% (wt/wt), preferably at least 80% (wt/wt), even more preferred at least 95%/wt/wt), yet more preferably at least 98% (wt./wt.).

The second reactor (R-2) and any subsequent reactor are preferably gas phase reactors (GPR). Such gas phase reactors (GPR) can be any mechanically mixed or fluid bed reactors. Preferably the gas phase reactors (GPR) comprise a fluid bed reactor with gas velocities of at least 0.2 m/sec. Thus, it is appreciated that the gas phase reactor is a fluidized bed type reactor.

According to an embodiment the first reactor (R-1) is a slurry reactor (SR), preferably a (bulk) loop reactor (LR) and/or the second reactor (R-2) is a gas phase reactor (GPR).

A preferred multistage process is a "loop-gas phase"-process, such as developed by Borealis A/S, Denmark (known as BORSTAR® technology) described e.g. in patent literature, such as in EP 0 887 379 or in WO 92/12182.

The temperature in the first polymerisation stage, i.e. step (a), in the first reactor (R-1), preferably in the slurry reactor (SR), like in the loop reactor (LR), is typically in the range from 65° C. to 100° C., preferably in the range from 70° C. to 95° C.

The pressure in the first polymerisation stage, i.e. step (a), in the first reactor (R-1), preferably in the slurry reactor (SR), like in the loop reactor (LR), is typically in the range from 25 bar to 100 bar, preferably 30 bar to 80 bar.

The hydrogen feed is typically adjusted to maintain a constant hydrogen to propylene ratio within the slurry reactor (SR), like in the loop reactor (LR). The ratio is maintained at such a homopolymer with the desired melt flow rate is obtained. While the actual value of the required hydrogen to propylene ratio depends, among others, on the catalyst and polymerization conditions, it has been found that good results have been obtained with a ratio in the range from 0.15 mol/kmol to 3.0 mol/kmol, preferably from 0.2 mol/kmol to 2.0 mol/kmol,. Hydrogen can be added in a manner known per se.

Subsequently, the reaction mixture of the first polymerisation stage, i.e. step (a), in the first reactor (R-1), preferably in the slurry reactor (SR), like in the loop reactor (LR) is transferred to the second polymerisation stage, i.e. step (b), in the second reactor (R-2), preferably the gas phase reactor (GPR-1).

In the second polymerization stage a polymer mixture comprising the first propylene homopolymer fraction (R-PP1) and the second propylene copolymer fraction (R-PP2) is formed. This is done by introducing the particles of the first propylene homopolymer fraction (R-PP1), containing active catalyst dispersed therein, i.e. step (b), together with additional propylene and comonomer, i.e. step (c), into the second polymerization stage (in the second reactor (R-2)). This causes the second propylene copolymer fraction (R-PP2) to form on the particles containing the first propylene homopolymer fraction (R-PP1). The second polymerization stage is conducted in the second reactor (R-2).

With respect to the comonomer content of the second propylene copolymer fraction (R-PP2) it is referred to the above.

The content of the comonomer in the second polymerization stage (the second reactor (R-2)) is controlled to obtain the desired comonomer content in the second propylene copolymer fraction (R-PP2) and the polypropylene copolymer (R-PP), respectively. Preferably the comonomer content of the second propylene copolymer fraction (R-PP2) is in the range from 0.1 to 6.0 mol-%, preferably from 0.1 to 5.0 mol-%, even more preferably from 0.2 to 3.0 mol-%, even more preferably 0.3 to 1.0 mol-%.

The temperature in the second polymerisation stage, i.e. step (d), in the second reactor (R-2), preferably in the gas phase reactor (GPR-1), is typically in the range from 50° C. to 100° C., preferably from 65° C. to 90° C., more preferably from 80° C. to 95° C.

The pressure in the second polymerisation stage, i.e. step (d), in the second reactor (R-2), preferably in gas phase reactor (GPR-2), is typically in the range from 10 bar to 40 bar, preferably 15 bar to 30 bar.

It may also be necessary to introduce additional hydrogen into the second polymerization stage, i.e. step (d), to control the melt flow rate of the polymer mixture. Suitably, the hydrogen feed is controlled to maintain constant hydrogen to propylene ratio in the fluidization gas. The actual ratio depends on the catalyst. Good results have been obtained by maintaining the ratio within the range from 0.2 mol/kmol to 10 mol/kmol, preferably from 0.5 mol/kmol to 5 mol/kmol. Hydrogen can be added for controlling the molar mass in a manner known per se.

The average residence time can vary in both reactor zones. In an embodiment of the process for producing the polypropylene copolymer (R-PP) the residence time in the first reactor (R-1) is in the range from 0.2 hours to 4 hours, e.g. 0.3 hours to 1.5 hours and the residence time in the second reactor (R-2) will generally be in the range from 0.2 hours to 6.0 hours, like 0.5 hours to 4.0 hours.

Usually the melt flow rate of the polypropylene prepared in the first polymerization stage is adjusted to be lower than the melt flow rate of the polypropylene prepared in the second polymerisation stage. According to the present invention it has surprisingly been found that a polypropylene copolymer (R-PP) with improved properties can be obtained when the melt flow rate of the first propylene homopolymer fraction (R-PP1), prepared in the first polymerization stage (first reactor (R1)), is adjusted to be higher than the melt flow rate of the second propylene copolymer fraction (R-PP2) prepared in the second polymerisation stage (second reactor (R2)). In other words, an inverse processing with respect to adjusting the melt flow rates of the polymers prepared in the individual polymerization stages can yield polymer compositions with improved properties.

With respect to the preferred melt flow rates of the first propylene homopolymer fraction (R-PP1) and the second propylene copolymer fraction (R-PP2) it is referred to above.

An embodiment of the process encompasses a pre-polymerization (P) prior to the polymerization in the first reactor (R-1). The pre-polymerization (P) can be conducted in the first reactor (R-1), however it is preferred that the pre-polymerization (P) takes place in a separate reactor, so called pre-polymerization reactor (P-R). A pre-polymerization reactor is of smaller size compared to the first (R-1) and second (R-2) reactor, respectively. Preferably, the reaction volume of the pre-polymerization reactor (P-R) will be between 5% and 30% of the reaction volume of the first reactor (R-1). In said pre-polymerization reactor (P-R), the pre-polymerization (P) is performed in bulk or slurry as defined for the first reactor (R-1) above.

Further it is appreciated that the pre-polymerization temperature is rather low, i.e. equal or below 50° C., more preferably in the range from equal or more than 10° C. to equal or below 50° C., yet more preferably from 12° C. to 45° C., even more preferably from 15° C. to 40° C., like from 18° C. to 35° C.

The pressure during pre-polymerization can be in the range from 20 bar to 80 bar, preferably from 25 bar to 75 bar, like from 30 to 70 bar. The average residence times can vary in the range from 0.1 hours to 1.5 hours, like from 0.2 hours and 1.0 hours.

Accordingly a process is preferred, wherein the first reactor (R-1) is a slurry reactor (SR), preferably a loop reactor (LR), and/or the second reactor (R-2) is a gas phase reactor (GPR-1).

According to an embodiment the reactor split with respect to the individual polymerization stages is adjusted in a manner so that a specific weight ratio between the first propylene homopolymer fraction (R-PP1) and the second propylene copolymer fraction (R-PP2) is obtained. It is preferred that the weight ratio between the first propylene homopolymer fraction (R-PP1) and the second propylene copolymer fraction (R-PP2) [(R-PP1)/(R-PP2)] is in the range from 70/30 to 30/70, more preferably in the range from 60/40 to 40/60.

The Solid Catalyst System (SCS)

A Ziegler-Natta type catalyst typically used in the present invention for propylene polymerization is a stereospecific, high yield Ziegler-Natta catalyst. The catalyst may be supported on a particulate support or self supported, i.e. the catalyst is not supported on an external support. Especially useful solid catalyst components are those disclosed in WO-A-03/000757, WO-A-03/000754 and WO-A-004/029112. These catalysts are solid catalysts of spherical particles with compact structure and low surface area. Further, these catalysts are featured by a uniform distribution of catalytically active sites thorough the catalyst particles.

It is preferred that solid catalyst system (SCS) comprises
(i) a transition metal (TM) selected from one of the groups 4 to 6 of the periodic table (IUPAC), preferably group 4 of the periodic table (IUPAC), even more preferably Ti,
(ii) a metal which is selected from one of the groups 1 to 3 of the periodic table (IUPAC), preferably Mg,
(iii) an internal electron donor (ID)
(iv) a cocatalyst (Co), like an aluminium compound, and
(v) an external donor (ED), like an organo silane compound especially an hydrocarbyloxy silane compound.

In other words a Ziegler-Natta type catalyst in form of a solid catalyst system (SCS) is preferred comprising, as essential components, a metal which is selected from one of the groups 1 to 3 of the periodic table (IUPAC), preferably Mg, a transition metal (TM) selected from one of the groups 4 to 6 of the periodic table (IUPAC), preferably from group 4 of the periodic table (IUPAC), even more preferably Ti, a cocatalyst (Co), preferably an aluminum compound and an external donor (ED), preferably an organo silane compound, even more preferably an hydrocarbyloxy silane compound.

These compounds may be supported on a particulate support. This particulate support is usually an inorganic oxide such as silica oxide or alumina oxide, or, an inorganic halide, such as magnesium halide. It is also possible that solid catalyst system (SCS) is self supported, i.e. the catalyst particles are not supported on an external support, but are prepared via the emulsion-solidification method or via the precipitation method.

Especially useful solid catalyst systems (SCS) are those disclosed in WO-A-2003/000757, WO-A-2003/000754, WO-A-2004/029112 and WO2007/137853. These catalysts are solid catalyst systems (SCS) of spherical particles with compact structure and low surface area of the particles. Further, these solid catalyst systems (SCS) are featured by a uniform distribution of catalytically active sites thorough the catalyst particles.

According to a preferred embodiment the solid catalyst system (SCS) is prepared via the emulsion-solidification method, where no external support is needed. The dispersed phase in the form of liquid droplets of the emulsion forms the catalyst, which is transformed to the solid catalyst system (SCS) during the solidification step.

Thus, in an especially preferred embodiment of the present invention, the solid catalyst systems (SCS) is prepared by a process comprising:
preparing a solution of a metal complex (C), preferably a magnesium complex by reacting an alkoxy metal compound, preferably an alkoxy magnesium compound and an internal donor (ID) or a precursor thereof (P-ID) in a $C_6$-$C_{10}$ aromatic liquid reaction medium;
reacting said metal complex (C), preferably magnesium complex with a transition metal compound comprising the transition metal (TM), preferably a tetravalent titanium compound, even more preferably $TiCl_4$, at a temperature greater than 10° C. and less than 50° C. to produce an emulsion of a denser, dispersed phase having a TM/metal mole ratio of 0.1 to 10 in a continuous phase having a TM/metal mole ratio of 10 to 100; and
agitating the emulsion, optionally in the presence of an emulsion stabilizer and/or a turbulence minimizing agent, in order to maintain the droplets of said dispersed phase within an average size range of 5 to 200 μm.

The catalyst particles are obtained after solidifying said droplets of the dispersed phase by heating, preferably at a temperature from 80° C. to 110° C. In said process a cocatalyst (Co), preferably an aluminium alkyl compound of the formula $AlR_{3-n}X_n$, where R is an alkyl and/or an alkoxy group of 1 to 20, preferably of 1 to 10 carbon atoms, X is a halogen and n is 0, 1 or 2, is added and brought into contact with the droplets of the dispersed phase of the agitated emulsion. Alternatively, the aluminium alkyl compound of the formula $AlR_{3-n}X_n$, is brought into contact with the solidified particles at the washing step before recovering the final solid particles.

As indicated above the solid catalyst system (SCS) also comprises an internal donor (ID). Suitable internal donors (ID) are, among others, esters of carboxylic acids, like phthalates, citraconates, and succinates. Also oxygen- or nitrogen-containing silicon compounds may be used. A class of compounds which is suitable to be used as an internal donor (ID) in the above-described catalyst manufacturing method is aromatic carboxylic acid esters or diesters. They can be formed in situ by reaction of an aromatic carboxylic acid chloride or diacid chloride with a $C_2$-$C_{16}$ alkanol and/or diol. An especially preferred compound to be used as an internal donor is di-2-ethyl-hexyl phthalate.

The cocatalyst (Co) used in combination with the transition metal compound typically comprises an aluminium compound, preferably an aluminium alkyl compound. The aluminium compound is preferably trialkyl aluminium such as trimethylaluminium, triethylaluminium, tri-isobutyl aluminium or tri-n-octylaluminium. However, the aluminium compound may also be an alkyl aluminium halide, such as diethyl aluminium chloride, dimethylaluminium chloride and ethylaluminium sesquichloride. The cocatalyst (Co) may also be a mixture of two or more of the above-mentioned compounds. Triethylaluminium is an especially preferred aluminium alkyl compound to be used as a cocatalyst (Co). The aluminium alkyl is preferably introduced to reach a desired ratio of the aluminium to transition metal (TM), preferably titanium. Suitable ratios depend on the catalyst and lie within the range of from 30 to 1000 mol/mol, such as 50 to 800 mol/mol.

As indicated above the solid catalyst system (SCS) also comprises an external donor (ED). Suitable external donors (ED) are known in the art include ethers, ketones, amines, alcohols, phenols, phosphines and silanes. In this respect an organo silane compounds, in particular hydrocarbyloxy silane compounds are preferred. In this respect organosilane compounds containing Si—OCOR, Si—OR, or Si—$NR_2$ bonds, having silicon as the central atom, and R is an alkyl, alkenyl, aryl, arylalkyl or cycloalkyl with 1-20 carbon atoms are particularly preferred. These compounds are known in the art. The external donor (ED) may also be a mixture of two or more of the above-mentioned compounds.

According to an embodiment the external donor comprises, preferably consist of, dicyclopentyldimethoxysilane and/or cyclohexylmethyldimethoxysilane. The organosilane compound is typically introduced to keep a desired molar ratio between aluminium alkyl and the silane compound. Preferably the solid catalyst system (SCS) comprises a cocatalyst (Co) with an aluminium compound and an external donor (ED) in the molar ratio [Al/(ED)] in the range from 3 to 800, preferably from 10 to 200.

It was surprisingly found that by carefully adjusting the molar ratio between cocatalyst (Co) and transition metal (TM), cocatalyst (Co) and external donor (ED) and external donor (ED) and transition metal (TM) a polypropylene copolymer (R-PP) with improved properties can be obtained.

Thus, it is preferred that the solid catalyst system (SCS) comprises a cocatalyst (Co) and a transition metal (TM) in the molar ratio [(Co)/(TM)] above 95, preferably in the range from above 95 to 250, even more preferably from 100 to 200, yet more preferably from 100 to 150.

Furthermore, it is preferred that the solid catalyst system (SCS) comprises a cocatalyst (Co) and a an external donor (ED) in the molar ratio [(Co)/(ED)] above 50, preferably in the range from above 50 to 250, even more preferably from 100 to 200, yet more preferably from 100 to 150.

Furthermore, it is preferred that the solid catalyst system (SCS) comprises an external donor (ED) and a transition metal (TM) in the molar ratio [(ED)/(TM)] below 10, preferably below 5, even more preferably in the range from 5 to 0.5, yet more preferably from 2 to 0.5, most preferably from 1.5 to 0.8.

According to an embodiment the solid catalyst system (SCS) comprises an external donor (ED) and a transition metal (TM) in the molar ratio [(ED)/(TM)] of 1.0.

Examples of suitable catalysts and compounds in catalysts are shown in among others, in WO-A-87/07620, WO-A-92/21705, WO-A-93/11165, WO-A-93/11166, WO-A-93/19100, WO-A-97/36939, WO-A-98/12234, WO-A-99/33842, WO-A-03/000756, WO-A-03/000757, WO-A-03/000754, WO-A-03/000755, WO-A-2004/029112, WO-A-92/19659, WO-A-92/19653, WO-A-92/19658, U.S. Pat. Nos. 4,382,019, 4,435,550, 4,465,782, 4,473,660, 4,560,671, 5,539,067, 5,618,771, EP-A-45975, EP-A-45976, EP-A-45977, WO-A-95/32994, U.S. Pat. Nos. 4,107,414, 4,186,107, 4,226,963, 4,347,160, 4,472,524, 4,522,930, 4,530,912, 4,532,313, 4,657,882, 4,581,342 and 4,657,882.

According to another aspect, the present invention is directed at a biaxially oriented polypropylene (BOPP) comprising at least 50 wt.-% of a polypropylene copolymer (R-PP) as described above, preferably at least 70 wt.-%, yet more preferably at least 85 wt.-%, still more preferably at least 95 wt.-%. According to a preferred embodiment the biaxially oriented polypropylene (BOPP) consists of a polypropylene copolymer (R-PP) as described above. In particular a biaxially oriented polypropylene (BOPP) comprising a polypropylene copolymer (R-PP) as described above prepared according to the process as described above.

According to another aspect, the present invention is directed at a process for the preparation of a biaxially oriented polypropylene (BOPP), comprising the steps of (a) preparing a polypropylene copolymer (R-PP) as described above (b) preparing a film comprising the polypropylene copolymer (R-PP), (c) biaxially orienting the film.

In the following the extrusion process for preparing the polymer film and the orientation process of the polymer film is described in more detail.

The polypropylene copolymer (R-PP) is extruded to pellets or granules as it is known in the art. Preferably co-rotating twin screw extruder is used for the extrusion step. The preperation of the film according to step (b) are produced according to the methods known in the art. Accordingly the film comprising the polypropylene copolymer (R-PP) is prepared by a cast film process or a blown film process as known in the art. Preferably the polypropylene copolymer (R-PP) is the only polymer within the film of step (b). Accordingly the film may contain additives but preferably no other polymer. Thus the remaining part up to 100.0 wt-% may be accomplished by additives known in the art, like antioxidants. However, this remaining part shall be not more than 5.0 wt.-%, preferably not more than 2.0 wt.-%, like not more than 1.0 wt. %, within the polymer film. Accordingly the polymer film preferably comprises more than 95.0 wt.-%, more preferably more 98.0 wt.-%, like more than 99.0 wt.-%, of the polypropylene copolymer (R-PP), as defined herein.

Furthermore, it is preferred that from the film of step (b) a biaxially oriented polypropylene (BOPP) is prepared, i.e. the film is subjected to a drawing process, obtaining thereby a biaxially oriented polypropylene (BOPP).

Preferably the biaxially oriented polypropylene (BOPP), has a draw ratio in machine direction of at least 3.0 and a draw ratio in transverse direction of at least 3.0. Such ratios are appreciated as commercial biaxially oriented polypropylene films must be stretchable at least to the above defined extent without breaking. The length of the sample increases during stretching in longitudinal direction and the draw ratio in longitudinal direction calculates from the ratio of current length over original sample length.

Subsequently, the sample is stretched in transverse direction, thereby increasing the width of the sample. Hence, the draw ratio calculates from the current width of the sample over the original width of the sample.

Preferably the draw ratio in machine direction of the biaxially oriented polypropylene (BOPP) ranges from 3.5 to 8.0. The draw ratio in transverse direction of the biaxially polypropylene (BOPP), ranges preferably from 4.0 to 15.0. Temperature range during stretching is generally in the range of 100° C. to 180° C.

The the biaxially oriented polypropylene (BOPP) can be prepared by conventional drawing processes known in the art.

In a specific process the tenter method is applied. The tenter method is in particular a method in which the polypropylene copolymer (R-PP), as defined herein is melt extruded from a slit die such as a T-die and cooled on a cooling drum obtaining an undrawn sheet. Said sheet is pre-heated for example with a heated metal roll and then drawn in the length direction between a plurality of rolls over which a difference in peripheral speeds is established and then both edges are gripped with grippers and the sheet is drawn in the transverse direction in an oven by means of a tenter resulting in a biaxially oriented film. The temperature of said stretched sheet during the longitudinal drawing is preferably controlled in such a way as to be within the temperature range of the melting point of the polypropylene copolymer (R-PP) as defined herein Thus, according to another aspect, the present invention is directed at the use of a polypropylene copolymer (R-PP) as described above, in the preparation of a biaxially oriented polypropylene (BOPP) as described above.

In the following the present invention is further illustrated by means of examples.

EXAMPLES

A. Measuring Methods

The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the isotacticity, regio-regularity and comonomer content of the polymers. Quantitative 13C{1H} NMR spectra were recorded in the solution-state using a Bruker Advance III 400 NMR spectrometer operating at 400.15 and 100.62 MHz for 1H and 13C respectively. All spectra were recorded using a 13C optimised 10 mm extended temperature probehead at 125° C. using nitrogen gas for all pneumatics. For polypropylene homopolymers approximately 200 mg of material was dissolved in 1,2-tetrachloroethane-d2 (TCE-d2). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 8192 (8 k) transients were acquired per spectra.

For ethylene-propylene copolymers approximately 200 mg of material was dissolved in 3 ml of 1,2-tetrachloroethane-d2 (TCE-d2) along with chromium-(III)-acetylacetonate (Cr(acac)3) resulting in a 65 mM solution of relaxation agent in solvent {singh09}. To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative 13C{1H} NMR spectra were processed, integrated and relevant quantitative properties determined from the integrals using proprietary computer programs. For ethylene-propylene copolymers all chemical shifts were indirectly referenced to the central methylene group of the ethylene block (EEE) at 30.00 ppm using the chemical shift of the solvent. This approach allowed comparable referencing even when this structural unit was not present.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of Interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$$P21e=(Ie6+Ie8)/2$$

The amount of 1,2 primary inserted propene was quantified based on the methyl region with correction undertaken for sites included in this region not related to primary insertion and for primary insertion sites excluded from this region:

$$P12=ICH3+P12e$$

The total amount of propene was quantified as the sum of primary inserted propene and all other present regio defects:

$$Ptotal=P12+P21e$$

The mole percent of 2,1 erythro regio defects was quantified with respect to all propene:

$$[21e]\ mol\ \%=100*(P21e/Ptotal)$$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The mole fraction of ethylene in the polymer was quantified using the method of Wang et. al (Wang, W-J., Zhu, S., Macromolecules 33 (2000)) through integration of multiple signals across the whole spectral region of a 13C{1H} spectra acquired using defined conditions. This method was chosen for its accuracy, robust nature and ability to account for the presence of regio-defects when needed.

Integral regions were slightly adjusted to increase applicability to a wider range of comonomer contents.

The mole percent comonomer incorporation in the polymer was calculated from the mole fraction according to:

$$E\ [mol\ \%]=100*fE$$

The weight percent comonomer incorporation in the polymer was calculated from the mole fraction according to:

$$E\ [wt\ \%]=100*(fE*28.05)/((fE*28.05)+((1-fE)*42.08))$$

The comonomer sequence distribution at the triad level was determined using the method of Kakugo et al. (Kakugo, M., Naito, Y., Mizunuma, K., Miyatake, T. Macromolecules 15 (1982) 1150 through integration of multiple signals across the whole spectral region of a 13C{1H} spectra acquired using defined conditions. This method was chosen for its robust nature. Integral regions were slightly adjusted to increase applicability to a wider range of comonomer contents.

The mole percent of a given comonomer triad sequence in the polymer was calculated from the mole fraction determined by the method of Kakugo et at. (Kakugo, M., Naito, Y., Mizunuma, K., Miyatake, T. Macromolecules 15 (1982) 1150) according to:

$$XXX\ [mol\ \%]=100*fXXX$$

The mole fraction comonomer incorporation in the polymer, as determined from the comonomer sequence distribution at the triad level, were calculated from the triad distribution using known necessary relationships (Randall, J. Macromol. Sci., Rev. Macromol. Chem. Phys. 1989, C29, 2010):

$$fXEX=fEEE+fPEE+fPEP$$

$$fXPX=fPPP+fEPP+fEPE$$

where PEE and EPP represents the sum of the reversible sequences PEE/EEP and EPP/PPE respectively.

The randomness of the comonomer distribution was quantified as the relative amount of isolated ethylene sequences as compared to all incorporated ethylene. The randomness was calculated from the triad sequence distribution using the relationship:

The mole percent co-monomer incorporation was calculated from the mole fraction.

The weight percent co-monomer incorporation was calculated from the mole fraction.

Calculation of co-monomer content of the second propylene copolymer fraction (R-PP2):

$$\frac{C(R-PP)}{w(R-PP2)}=C(R-PP2)$$

wherein w(R-PP2) is the weight fraction [in mol-%] of the second propylene copolymer fraction (R-PP2), C(R-PP) is the co-monomer content [in mol-%] of the polypropylene copolymer (R-PP) obtained after the second polymerization reactor (R-2), i.e. the mixture of the first propylene homopolymer fraction (R-PP1) and second propylene copolymer fraction (R-PP2), C(R-PP2) is the calculated comonomer content [in mol-%] of the second propylene copolymer fraction (R-PP2).

Melt Flow Rate (MFR)

The melt flow rates are measured with a load of 2.16 kg (MFR$_2$) at 230° C. The melt flow rate is that quantity of polymer in grams which the test apparatus standardised to ISO 1133 extrudes within 10 minutes at a temperature of 230° C. under a load of 2.16 kg.

Calculation of melt flow rate MFR$_2$ (230° C.) of the second propylene copolymer fraction (R-PP2):

$$MI_b = (w_1 \cdot MI_1^{-0.0965} + w_2 \cdot MI_2^{-0.0965})^{-\frac{1}{0.0965}}$$

where w is the weight fraction of the polymer fraction in the polypropylene copolymer (R-PP), MI is the melt index MFR$_2$ and subscripts b, 1 and 2 refer to overall blend, the first propylene homopolymer fraction (R-PP1) and second propylene copolymer fraction (R-PP2), respectively.

Number average molecular weight ($M_n$), weight average molecular weight ($M_w$) and polydispersity (Mw/Mn) are determined by Gel Permeation Chromatography (GPC) according to the following method:

The weight average molecular weight Mw and the polydispersity (Mw/Mn), wherein Mn is the number average molecular weight and Mw is the weight average molecular weight) is measured by a method based on ISO 16014-1: 2003 and ISO 16014-4:2003. A Waters Alliance GPCV 2000 instrument, equipped with refractive index detector and online viscosimeter was used with 3× TSK-gel columns (GMHXL-HT) from TosoHaas and 1,2,4-trichlorobenzene (TCB, stabilized with 200 mg/L 2,6-Di tert butyl-4-methylphenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

The xylene soluble fraction at room temperature (XCS, wt.-%): The amount of the polymer soluble in xylene is determined at 25° C. according to ISO 16152; first edition; 2005-07-01.

DSC analysis, melting temperature ($T_m$), crystallization temperature ($T_c$): measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and heat of crystallization ($H_c$) are determined from the cooling step, while melting temperature and heat of fusion ($H_f$) are determined from the second heating step.

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Tensile Test

Tensile tests are performed according to ISO 527-2 at +23° C. on injection molded specimen (type 1B, 4 mm thickness) prepared by injection moulding in line with ISO 1873-2. The tensile modulus (E-modulus) was calculated from the linear part of said tensile test results, conducting that part of the measurement with an elongation rate of 5 mm/min. For determining tensile stress at yield (in MPa), tensile strain at yield (in %), tensile strength (in MPa), tensile strain at tensile strength (in %), tensile stress at break (in MPa) and tensile strain at break (in %) the aforementioned tensile test according to ISO 527-2 at +23° C. was continued with an elongation rate of 50 mm/min until the specimen broke.

The Vicat A softening temperature is the temperature at which a test specimen is penetrated to a depth of 1 mm by a flat-ended needle with a 1 mm$^2$ circular or square cross-section. The Vicat A softening temperature is measured according to ISO 306 using injection molded test specimen (80×10×4 mm$^3$) using a test load of 10 N, as described in EN ISO 1873-2.

The yield stress (N/mm$^2$) was obtained from the recorded force (N) versus draw ratio (λ) curves, logged during each drawing experiment. Reported are the forces recorded in machine direction (MD). The forces in transverse direction were identical, due to the simultaneous equibiaxial drawing step. The first local force maximum of the curve (approximately at draw ratio λ=1.37) was taken as the yield force. The yield stress was calculated by dividing the yield force by the initial undeformed cross section of the specimen: Yield stress=(force/area)×5); area=0.750×70 mm. The factor 5 in the calculation accounts for the fact that out of 5 clips drawing the film in one direction, only 1 clip recorded the force.

B. Examples

The poly propylene copolymers of inventive examples IE1 and IE2 have been produced in a Borstar PP pilot plant in a two step polymerisation process, starting with polymerisation in a bulk-phase loop reactor followed by polymerization in a gas phase reactor, adjusting the parameters as described in table 1a. The catalyst used in the polymerization process for the propylene copolymer of the inventive examples IE1 and IE2 was the catalyst described in WO 2010/009827 A1 one pages 30 to 31. TEAL was triethyl alauminium and the external donor was dicyclopentyldimethoxysilane (DCPDMS).

The propylene copolymers of comparative examples CE1, CE3 and CE4 have been produced in a Borstar PP pilot plant in a two step polymerisation process, starting with polymerisation in a bulk-phase loop reactor followed by polymerization in a gas phase reactor, adjusting the parameters as described in table 1b. The catalyst used in the polymerization process for the propylene copolymer of comparative examples CE1, CE3 and CE4 was the catalyst described in WO 2010/009827 Al one pages 30 to 31. TEAL was triethyl alauminium and the external donor was dicyclopentaldimethoxysilane (DCPDMS).

Comparative example CE2 is the commercial propylene T03DB from Borealis Polyolefine GmbH, Austria.

The TEAL to external donor ratio (TEAL/Donor), the TEAL to titanium ratio (TEAL/Ti), the external donor to titanium ratio (Donor/Ti) and the polymerization conditions are indicated in tables 1a and 1b.

TABLE 1a

Preparation of inventive propylene copolymers (R-PP)

|  |  | IE1 | 1E2 |
|---|---|---|---|
| Donor |  |  |  |
| TEAL/Ti | [mol/mol] | 130 | 130 |
| TEAL/Donor | [mol/mol] | 130 | 130 |
| Donor/Ti | [mol/mol] | 1.0 | 1.0 |
| LOOP (R-PP1) |  |  |  |
| time | [min] | 20 | 20 |
| temp | [° C.] | 80 | 80 |
| split | [wt.-%] | 50 | 50 |
| C2 | [mol %] | 0 | 0 |
| MFR$_2$ | [g/10'] | 7.0 | 4.0 |
| H2/C3 | [mol/kmol] | 0.64 | 0.37 |
| pressure | [bar] | 53 | 53 |
| XCS | [wt.-%] | 5.3 | 5.3 |
| mmmm | [%] | 90.3 | 90.3 |
| 2,1 e | [%] | 0 | 0 |
| GPR1 (R-PP2) |  |  |  |
| time | [min] | 120 | 120 |
| temp | [° C.] | 75 | 75 |
| split | [wt.-%] | 50 | 50 |
| C2 | [mol %] | 0.9 | 0.9 |
| MFR$_2$ | [g/10'] | 1.1 | 2.0 |
| H2/C3 | [mol/kmol] | 1.8 | 5.0 |
| pressure | [bar] | 19 | 19 |

TABLE 1b

Preparation of comparative propylene homopolymer

|  |  | CE1 | CE3 | CE4 |
|---|---|---|---|---|
| Donor |  | D | D | D |
| TEAL/Ti | [mol/mol] | 130 | 95 | 95 |
| TEAL/Donor | [mol/mol] | 130 | 50 | 50 |
| Donor/Ti | [mol/mol] | 1 | 1.8 | 1.8 |

TABLE 1b-continued

Preparation of comparative propylene homopolymer

| | | CE1 | CE3 | CE4 |
|---|---|---|---|---|
| LOOP (R-PP1) | | | | |
| time | [min] | 20 | 20 | 20 |
| temp | [° C.] | 75 | 80 | 80 |
| split | [wt.-%] | 50 | 40 | 40 |
| $MFR_2$ | [g/10'] | 7 | 1 | 1 |
| C2 | [mol %] | 0.0 | 0.3 | 0.75 |
| H2/C3 | [mol/kmol] | 0.64 | 0.25 | 0.21 |
| pressure | [bar] | 53 | 53 | 53 |
| XCS | [wt.-%] | 6.5 | 2.6 | 3.6 |
| mmmm | [%] | 90.3 | 94.9 | 92.5 |
| 2,1 e | [%] | 0 | 0 | 0 |
| GPR1 (R-PP2) | | | | |
| time | [min] | 120 | 120 | 120 |
| temp | [° C.] | 75 | 75 | 75 |
| split | [wt.-%] | 50 | 60 | 60 |
| C2 | [mol %] | 0.0 | 0.3 | 0.3 |
| $MFR_2$ | [g/10'] | 1.8 | 6.5 | 10.7 |
| H2/C3 | mol % | 1.300 | 42 | 0.02 |
| pressure | [bar] | 19 | 19 | 19 |

TABLE 2a

Properties of inventive propylene copolymers

| | | IE1 | IE2 |
|---|---|---|---|
| C2 | [mol %] | 0.45 | 0.45 |
| XCS | [wt %] | 6.1 | 5.0 |
| $MFR_2$ | [g/10'] | 2.6 | 3.2 |
| MWD | [—] | 4.6 | 4.1 |
| Tm | [° C.] | 160.5 | 161.1 |
| Tc | [° C.] | 113.5 | 122 |
| Vicat A | [° C.] | 150.3 | 151.4 |
| 2,1 e | [%] | 0 | 0 |
| mmmm | [%] | 90.3 | 90.3 |
| Tg | [° C.] | −3 | −2 |
| EM | [MPa] | 1429.6 | 1552 |
| EB | [%] | 120.3 | 130.9 |

TABLE 2b

Properties of comparative propylene copolymers

| | | CE1 | CE2 | CE3 | CE4 |
|---|---|---|---|---|---|
| C2 | [mol %] | 0.0 | 0.0 | 0.3 | 0.3 |
| XCS | [wt %] | 4.2 | 5.4 | 2.2 | 3.3 |
| $MFR_2$ | [g/10'] | 3.4 | 3.08 | 2.9 | 4.4 |
| MWD | [—] | 4.5 | 5.5 | 4.6 | 4.1 |
| Tm | [° C.] | 163.8 | 161.7 | 161.5 | 161.2 |
| Tc | [° C.] | 124.2 | 111.9 | 118.5 | 117.1 |
| Vicat A | [° C.] | 154.8 | 154.7 | 154.5 | 152.2 |
| 2,1 e | [%] | 0 | 0 | 0 | 0 |
| mmmm | [%] | 90.3 | 92.7 | 94.9 | 92.5 |
| Tg | [° C.] | 0 | −2 | 2 | 1 |
| EM | [MPa] | 1750 | 1575 | 1697 | 1654 |
| EB | [%] | 80 | 226.1 | 69.3 | 95.5 |

D DCPDMS
n.a. not analyzed
Tm melting temperature
Tc crystallization temperature
Vicat A Vicat A softening point
2,1 e 2,1 erythro regio-defects
mmmm isotactic pentad (mmmm) sequences (isotacticity)
Tg glass transition temperature
EM elongation modulus
EB elongation at break BOPP Film Preparation BOPP films were obtained by biaxially stretching square sized (9×9 cm) specimens, 750 μm thick, cut out from a cast film sample. The cast films were prepared by extruding the polymer in a twin screw extruder through a slit die and quenching the melt on a chill roll (CR), half immersed in a water bath (WB). The exit temperature of the melt (die temperature) was 240° C. The chill roll and the water bath were maintained at 24° C. and 20° C. respectively. The thickness of the cast films was 750 μm, achieved by using a die gap of 10 mm and extending the melt by a factor 13. Simultaneous, equibiaxial drawing of the specimens was performed on a Karo IV laboratory stretcher, as provided by Brückner Maschinenbau GmbH. The drawn gauge area was 7×7 cm. A nominal strain rate of 400% was applied to draw the specimens at 145° C., 150° C. and 155° C. after a pre-heating time of 60 seconds at the draw temperature. The draw ratio was 7×7.

TABLE 3

Stress at 145° C. of a biaxially oriented propylene copolymer film

| | | IE1 | IE2 | CE1 | CE2 | CE3 | CE4 |
|---|---|---|---|---|---|---|---|
| stress | [N/mm²] | 3.59 | 3.89 | 5.27 | 3.54 | 4.91 | 4.19 |

TABLE 4

Stress at 150° C. of a biaxially oriented propylene copolymer film

| | | IE1 | IE2 | CE1 | CE2 | CE3 | CE4 |
|---|---|---|---|---|---|---|---|
| stress | [N/mm²] | 2.60 | 2.77 | 3.85 | 2.52 | 3.53 | 3.07 |

TABLE 5

Stress at 155° C. of a biaxially oriented propylene copolymer film

| | | IE1 | IE2 | CE1 | CE2 | CE3 | CE4 |
|---|---|---|---|---|---|---|---|
| stress | [N/mm²] | 1.60 | 1.99 | 2.88 | 1.79 | 2.39 | 1.99 |

The invention claimed is:

1. A polypropylene copolymer (R-PP) having
   (a) a comonomer content in the range from 0.1 to 3.0 mol-% based on the weight of the polypropylene copolymer (R-PP), wherein the comonomer is ethylene,
   (b) a melt flow rate $MFR_2$ (230° C.) measured according to ISO 1133 in the range from 1.0 to 10.0 g/10min,
   (c) a melting temperature $T_m$ of more than 150.0° C. and
   (d) an isotacticity of not more than 92.0%,
   (e) a xylene cold soluble fraction (XCS) in the range from 4.0 to 10.0 wt.-%.

2. The polypropylene copolymer (R-PP) according to claim 1, wherein the polypropylene copolymer (R-PP) has
   (a) a Vicat A softening point of below 154.0° C. and/or
   (b) a molecular weight distribution (MWD) in the range of 3.0 to 10.0.

3. The polypropylene copolymer (R-PP) according to claim 1, wherein said polypropylene copolymer (R-PP) comprises two fractions, a first propylene homopolymer fraction (R-PP1) and a second propylene copolymer fraction (R-PP2), wherein said first propylene homopolymer fraction (R-PP1) differs from said second propylene copolymer fraction (R-PP2) in the melt flow rate.

4. The polypropylene copolymer (R-PP) according to claim 3, wherein
(a) the first propylene homopolymer fraction (R-PP1) and the second propylene copolymer fraction (R-PP2) fulfill together the inequation (Ia), $$\frac{MFR(R-PP1)}{MFR(R-PP2)} \geq 1.5 \tag{Ia}$$

wherein
MFR (R-PP1) is the melt flow rate $MFR_2$ (230° C.) [g/10min] of the first propylene homopolymer fraction (R-PP1) and
MFR (R-PP2) is the melt flow rate $MFR_2$ (230° C.) [g/10min] of the second propylene copolymer fraction (R-PP2)
and/or
(b) the polypropylene copolymer (R-PP) and the second propylene copolymer fraction (R-PP2) fulfill together the inequation (IIa)

$$\frac{MFR(R-PP1)}{MFR(R-PP)} \geq 1.3 \tag{IIa}$$

wherein
MFR (R-PP) is the melt flow rate $MFR_2$ (230° C.) [g/10min] of the polypropylene copolymer (R-PP) and
MFR (R-PP1) is the melt flow rate $MFR_2$ (230° C.) [g/10min] of the first propylene homopolymer fraction (R-PP1).

5. The polypropylene copolymer (R-PP) according to claim 3, wherein the second propylene copolymer fraction (R-PP2) has a comonomer content in the range from more than 0.1 to 6.0 mol-%.

6. The polypropylene copolymer (R-PP) according to claim 3, wherein the first propylene homopolymer fraction (R-PP1) has a higher melt flow rate than the second propylene copolymer fraction (R-PP2).

7. A process for preparing a polypropylene copolymer (R-PP) according to claim 3, comprising a first propylene homopolymer fraction (R-PP1) and a second propylene copolymer fraction (R-PP2), wherein said process is a sequential polymerization process comprising at least two reactors connected in series, wherein said process comprises the steps of (a) polymerizing in a first reactor (R-1)
  (a1) propylene obtaining thereby said first propylene homopolymer fraction (R-PP1),
(b) transferring said first propylene homopolymer fraction (R-PP1) and unreacted monomers from the first reactor (R-1) into a second reactor (R-2),
(c) feeding to said second reactor (R-2)
  (c1) propylene and
  (c2) ethylene,
(d) polymerizing in said second reactor (R-2) and in the presence of said first propylene homopolymer fraction (R-PP1)
  (d1) propylene and
  (d2) ethylene,
obtaining said polypropylene copolymer (R-PP) comprising the first propylene homopolymer fraction (R-PP1) and the second propylene copolymer fraction (R-PP2),
wherein the polymerization takes place in the presence of a solid catalyst system (SCS), said solid catalyst system (SCS) comprises
  (i) a transition metal (TM) selected from one of the groups 4 to 6 of the periodic table (IUPAC),
  (ii) a metal which is selected from one of the groups 1 to 3 of the periodic table (IUPAC),
  (iii) an internal electron donor (ID)
  (iv) a cocatalyst (Co), and
  (v) an external donor (ED).

8. The process according to claim 7, wherein the solid catalyst system (SCS) comprises a cocatalyst (Co) and a transition metal (TM) in the molar ratio [(Co)/(TM)] above 95.

9. The process according to claim 7, wherein the solid catalyst system (SCS) comprises a cocatalyst (Co) and a an external donor (ED) in the molar ratio [(Co)/(ED)] above 50.

10. The process according to claim 7, wherein the solid catalyst system (SCS) comprises an external donor (ED) and a transition metal (TM) in the molar ratio [(ED)/(TM)] below 10.

11. A biaxially oriented polymer film comprising a polypropylene copolymer (R-PP) according to claim 1.

12. A process for preparing a biaxially oriented polypropylene (BOPP) according to claim 11 comprising the steps of
(a) preparing a polypropylene copolymer (R-PP),
(b) preparing a film comprising the polypropylene copolymer (R-PP), and
(c) biaxially orienting the film.

\* \* \* \* \*